UNITED STATES PATENT OFFICE.

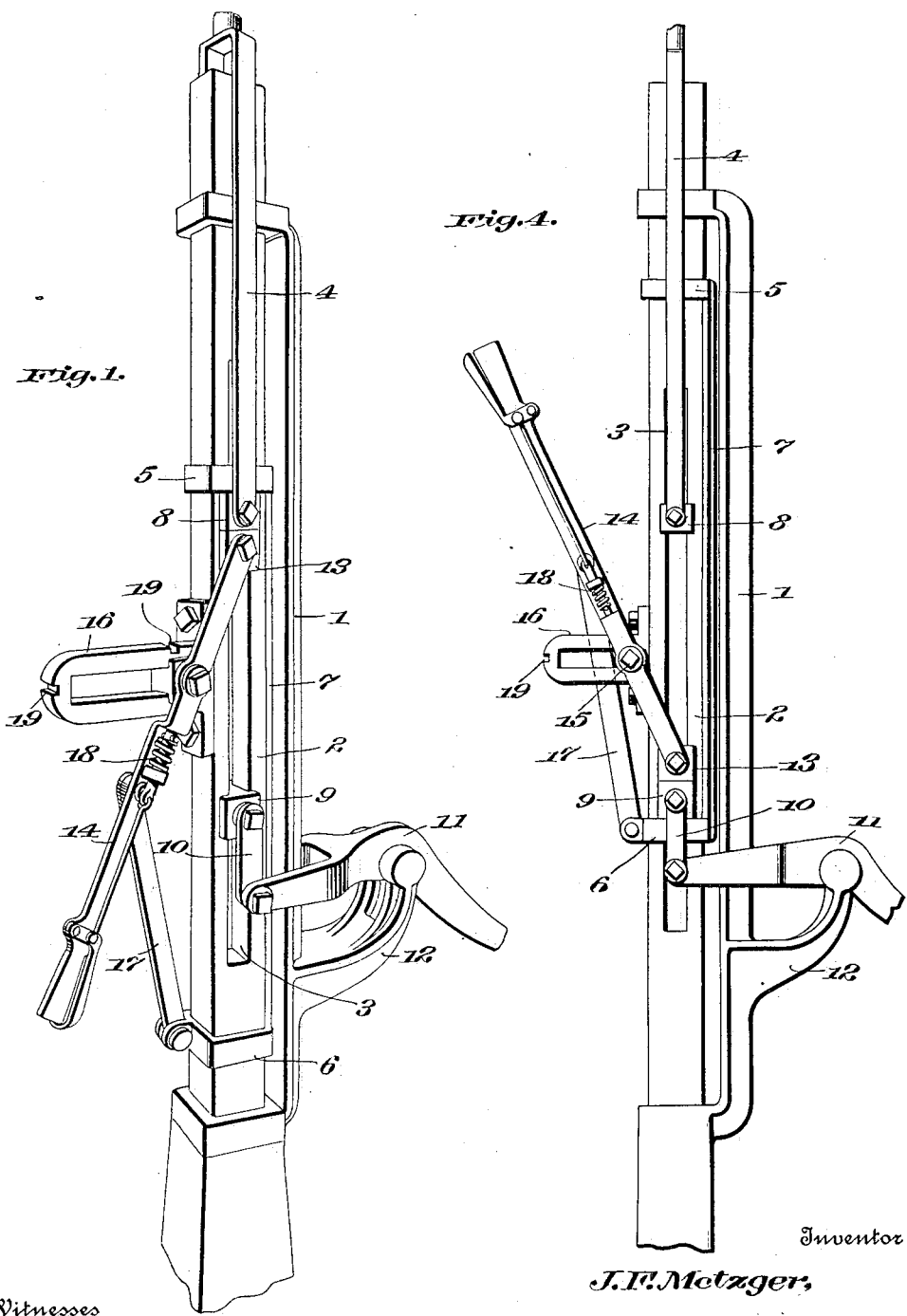

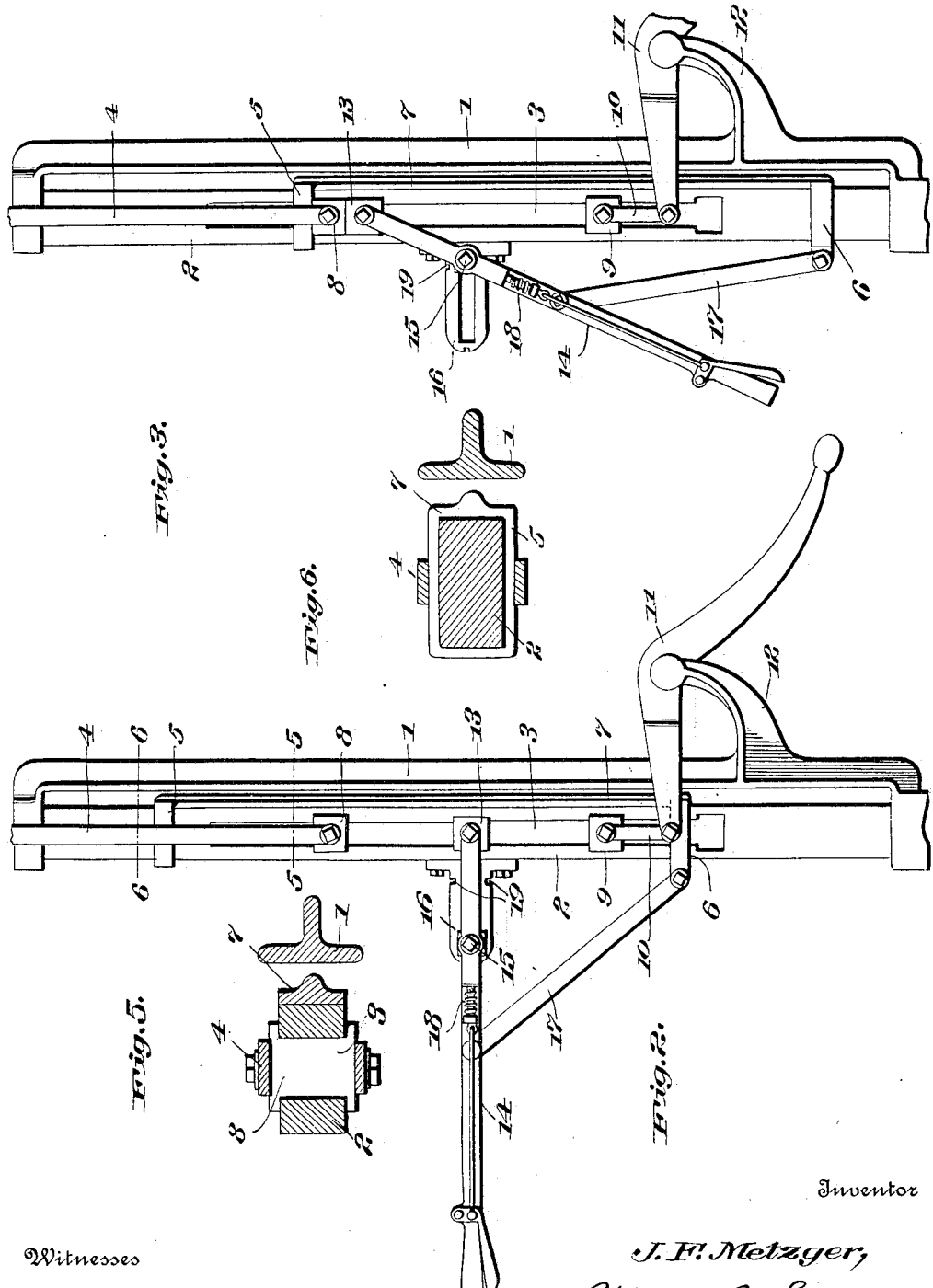

JAMES F. METZGER, OF FLAT ROCK, OHIO.

ATTACHMENT FOR WIND-DRIVEN PUMPS.

1,091,371.  Specification of Letters Patent.  Patented Mar. 24, 1914.

Application filed April 2, 1913. Serial No. 758,444.

*To all whom it may concern:*

Be it known that I, JAMES F. METZGER, a citizen of the United States, residing at Flat Rock, in the county of Seneca and State of Ohio, have invented new and useful Improvements in Attachments for Wind-Driven Pumps, of which the following is a specification.

The invention relates generally to attachments for wind driven pumps, and particularly to a device in the use of which the operative control of the sucker rod may be shifted from the wind power rod to a hand power rod, or the reverse.

The main object of the present invention is the provision of a manually operable element slidably connected with the sucker rod and which in one position will connect said sucker rod for control by the wind power rod, and in another position will place the control of the sucker rod in operative connection with a hand lever, and in another position will cut out both the wind power rod and hand lever from sucker rod control.

The invention in its preferred form of details will be described in the following specification, reference being had particularly to the accompanying drawings, in which:—

Figure 1 is a perspective view illustrating the application of the improvement. Fig. 2 is a vertical section showing the control means in neutral position. Fig. 3 is a similar view showing the control means in position to operate the sucker rod through the wind power rod. Fig. 4 is a similar view showing the control means in position to operate the sucker rod by hand power. Fig. 5 is a transverse section on the line 5—5 of Fig. 2. Fig. 6 is a transverse section on the line 6—6 of Fig. 2.

Referring particularly to the accompanying drawings, the improved pump is designed to be of that type known as wind mill or wind power pump and it is to be understood that while showing only sufficient of such structure to disclose a clear understanding of the present invention, I contemplate, aside from the specific details herein referred to, the use of any preferred type of pump, frame structure, superstructure or power means.

Generally speaking 1 represents the guide frame rising from the base frame of the structure in which guide frame the sucker rod 2 is longitudinally movable as usual. The sucker rod for coöperation with the detailed structure of the present invention, is formed for appropriate length with longitudinally extending slot 3, and the wind power rod 4 extends longitudinally of the sucker rod and is freely slidable in the latter. Encircling the sucker rod are upper and lower collars 5 and 6. These collars are freely slidable on the sucker rod to secure in relatively fixed relation to each other by a bar 7 extending from the upper collar to the lower collar. The collars are spaced apart a distance corresponding approximately to the length of the slot 3, but as will presently appear, are designed to be slidably operated on the sucker rod for operative use in the invention. The lower end of the wind power rod 4 is provided with a block 8, of a size to freely slide within the slot 3 and having a length exceeding the diameter of the sucker rod so that the ends of the block project beyond the surface of the sucker rod. The block 8 is mounted in the slot 3 below the upper collar 5, and the similar block 9 is slidably mounted in the slot 3 above the lower collar 6, said block 9 being connected through the medium of a link 10 with the inner end of the lever 11 mounted upon a fulcrum upright 12, the lever being hereinafter designated the hand operating device and being intended to functionally illustrate any desired type of hand collar.

Slidably mounted in the slot 3 between the blocks 8 and 9 is what I term a lock block 13, said block being connected to one end of the operating lever 14 having its fulcrum 15 slidably mounted in the slotted fulcrum support 16 secured to the outer surface of the sucker rod and preferably projecting at right angles to the length of such rod. A link 17 connects the operating lever 14 with the lower collar 6, the connection between the link and lever being beyond the pivot 15 relative to the sucker rod. A locking device of any desired type, shown as a pawl and handle therefor 18 is carried on the operating lever and designed to coöperate with appropriately formed notches 19 in the fulcrum support 16.

As previously stated, the operating means, which includes the collars 5 and 6, the block 13, and the operating lever 14, is adapted for one of three positions; that is a neutral position in which the sucker rod is free of control by either wind power rod or hand power, a second position in which the sucker rod is connected to the wind power rod, and a third position in which the sucker rod is connected to the hand power. In Fig. 2 I have shown a device as a neutral position in which it will be noted that the operating lever is locked at right angles to the length of the sucker rod so that the lock block 13 is disposed equally between the blocks 8 and 9. The wind power rod and hand power may thus be freely operated without in any way affecting the sucker rod.

In Fig. 3 I have shown the operating device in position to lock the sucker rod to the wind power rod. In this position the lever 14 is turned so as to force the block 13 upwardly until the block 8 of the wind power rod is clamped between the upper collar 5 and the lock block 13, this movement of the operating lever from the medium of the link 17 drawing the upper collar downward to clamping position. With the operating lever locked in this position, the sucker rod is fixed to the wind power rod and hence power applied to the latter will operate the sucker rod.

In Fig. 4, I have shown the sucker rod as operatively connected to the hand power. Under these conditions, the operating lever is reversed, that is moved to force the lock block downwardly and at the same time carry the lower collar 6 upward. When the operating lever is in position shown in Fig. 4, the block 9 of the hand power device is clamped between the collar 6 and lock block 13, so that with the operating lever locked in this position the hand power device alone has control of the sucker rod.

From the description, it will be obvious that by suitable and simple manipulation of the operating lever, I can readily place the sucker rod within the control of the wind power or hand power or free of control from either the hand power or wind power. In use of the form of wind power herein, it is of course to be understood that any mechanical power is intended.

What is claimed is:—

1. The combination with a sucker rod of a pump formed with an elongated slot, a power rod freely slidable in the sucker rod and having a block operable in the slot, a hand operated means including a block operable in the slot, clamping collars encircling the sucker rod and arranged beyond the respective blocks, and an intermediate manually operable block to coöperate with either of the first mentioned blocks and clamping same against adjacent collars.

2. The combination with a sucker rod of a pump formed with an elongated slot, a power rod freely slidable in the sucker rod and having a block operable in the slot, a hand operated means including a block operable in the slot, clamping collars encircling the sucker rod and arranged beyond the respective blocks, an intermediate block operable in the slot, a lever for shifting said block and means connecting said lever with the collars to induce simultaneous movement of the collars and intermediate block.

3. The combination with a sucker rod of a pump formed with an elongated slot, a power rod freely slidable in the sucker rod and having a block operable in the slot, a hand operated means including a block operable in the slot, clamping collars encircling the sucker rod and arranged beyond the respective blocks, an intermediate block operable in the slot, a lever for shifting said block and means connecting said lever with the collars to induce simultaneous movement of the collars and intermediate block, and means for locking the lever in desired position.

In testimony whereof I affix my signature in presence of two witnesses.

JAMES F. METZGER.

Witnesses:
H. J. HOFFMAN,
S. J. HUFF.

Copies of this patent may be obtained for five cents each, by addressing the "Commissioner of Patents, Washington, D. C."